United States Patent
Choi et al.

(10) Patent No.: US 7,777,837 B2
(45) Date of Patent: Aug. 17, 2010

(54) LCD POLARIZERS

(75) Inventors: Sang-Gun Choi, Suwon-si (KR); Kweon-Sam Hong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 331 days.

(21) Appl. No.: 11/801,166

(22) Filed: May 8, 2007

(65) Prior Publication Data
US 2007/0268428 A1 Nov. 22, 2007

(30) Foreign Application Priority Data
May 22, 2006 (KR) .................. 10-2006-0045794

(51) Int. Cl.
*G02F 1/1335* (2006.01)
(52) U.S. Cl. .................................... 349/96
(58) Field of Classification Search .............. None
See application file for complete search history.

(56) References Cited

U.S. PATENT DOCUMENTS

| | | | | |
|---|---|---|---|---|
| 2004/0201795 A1* | 10/2004 | Paukshto | ................ | 349/96 |
| 2005/0057706 A1* | 3/2005 | Seki et al. | ................ | 349/96 |
| 2005/0083450 A1* | 4/2005 | Motomura et al. | ........... | 349/96 |
| 2006/0154396 A1* | 7/2006 | Kameyama et al. | ........... | 438/30 |

FOREIGN PATENT DOCUMENTS

| | | |
|---|---|---|
| CN | 1608218 A | 4/2005 |
| CN | 1662832 A | 8/2005 |
| CN | 1690805 A | 11/2005 |
| CN | 1703459 A | 11/2005 |
| CN | 1746746 A | 3/2006 |
| JP | 10-307291 | 11/1998 |
| JP | 2005-99475 | 4/2005 |
| JP | 2005-134521 | 5/2005 |
| JP | 2005-195984 | 7/2005 |

OTHER PUBLICATIONS

Patent Abstracts of Japan, Publication No. 10-307291, Nov. 17, 1998, 1 p.
Patent Abstracts of Japan, Publication No. 2005-099475, Apr. 14, 2005, 1 p.
Patent Abstracts of Japan, Publication No. 2005-134521, May 26, 2005, 1 p.
Patent Abstracts of Japan, Publication No. 2005-195984, Jul. 21, 2005, 1 p.

* cited by examiner

*Primary Examiner*—Tina M Wong
(74) *Attorney, Agent, or Firm*—Innovaton Counsel LLP (57) ABSTRACT

A light polarizer for use in an LCD includes a polarizing film, a retardation film, and an auxiliary film. The auxiliary film increases the total thickness of the polarizer such that the polarizer can be easily detached from the LCD for rework without damaging the LCD.

19 Claims, 10 Drawing Sheets

Fig. 8

LCD POLARIZERS

RELATED APPLICATIONS

This application claims priority of Korean Patent Application No. 2006-45794, filed May 22, 2006, the entire disclosure of which is incorporated herein by reference.

BACKGROUND

This disclosure relates to light polarizers for liquid crystal displays (LCDs), in general, and in particular, to LCD polarizers that make rework of display panels easier and thereby reduce LCD production costs.

LCDs include a liquid crystal display panel on which an image is displayed. The display panel includes a layer of a liquid crystal material. The liquid crystals exhibit a mesomorphic phase representing both liquid and solid properties, and the optical transmittance thereof varies depending on the alignment direction thereof. The LCD panel is provided with polarizers on opposite surfaces thereof, wherein each polarizer polarizes light in a specific direction.

LCDs apply an electric field to the layer of liquid crystal material, thereby adjusting the direction of alignment of the liquid crystals therein so as to generate an optical transmittance corresponding to an image to be displayed by the liquid crystals. When the alignment direction of the liquid crystals is adjusted, the image is displayed through the polarization action of the polarizers.

The polarizers are attached to opposite surfaces of the LCD panel during its manufacture. During the manufacturing process, at least one of the polarizers may become defecting, thus requiring that the panel be reworked to remove and replace the defective polarizer. In such case, the previously attached polarizer must be detached from the liquid crystal panel, and a new polarizer attached to the panel in place of the defective polarizer. However, it is not easy to detach previously attached polarizers from a display panel, and it is possible for the panel to be damaged if defective polarizers are forcibly detached from it.

BRIEF SUMMARY

In accordance with the exemplary embodiments thereof described herein, LCD polarizers are provided that make rework of LCD display panels much easier without damaging the panels, thereby enabling LCD production costs to be reduced.

In one exemplary embodiment, a polarizer includes a polarizing film, a retardation film, and an auxiliary film. The retardation film is attached to a top surface of the polarizing film with a first adhesive strength. The auxiliary film is attached to a top surface of the retardation film with a second adhesive strength that is stronger than the first adhesive strength.

The auxiliary film does not change the optical characteristics of light transmitted through the auxiliary film, and serves to increase the total thickness of the polarizer. When the polarizer is first attached to an LCD display panel, and is then detached for rework purposes, the polarizer can be easily detached from the LCD panel because the polarizer has a thickness that is sufficient to enable the polarizer to be detached from the panel without damaging it.

In another exemplary embodiment, an LCD includes a first substrate, a second substrate, a layer of a liquid crystal material, a first polarizer and a second polarizer. The first substrate has a first electrode. The second substrate has a second electrode disposed to face the first electrode. The liquid crystal layer is disposed between the first and second electrodes. The first polarizer is attached to a bottom surface of the first substrate. The second polarizer is attached to a top surface of the second substrate. Each of the first and second polarizers includes a polarizing film, a retardation film, and an auxiliary film.

A better understanding of the above and many other features and advantages of the novel LCD polarizers of the present invention may be obtained from a consideration of the detailed description below of some exemplary embodiments thereof, particularly if such consideration is made in conjunction with the appended drawings, wherein like reference numerals are used to identify like elements illustrated in one or more of the figures thereof.

DETAILED DESCRIPTION

Figure 1:
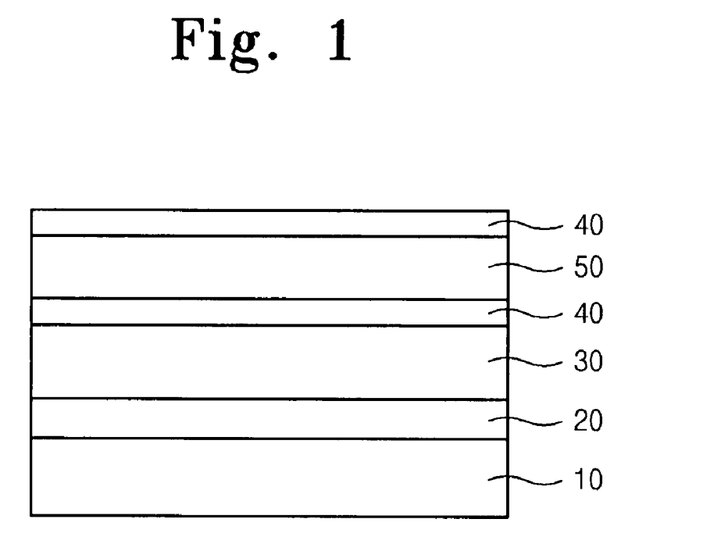
FIG. 1 is a partial cross-sectional view of a first exemplary embodiment of an LCD polarizer in accordance with the present invention.

FIG. 1 is a partial cross-sectional view of a first exemplary embodiment of a light polarizer for an LCD in accordance with the present invention. In FIG. 1, the exemplary polarizer includes a polarizing film 20, a retardation film 30, and an auxiliary film 50. The polarizing film 20 comprises polyvinyl alcohol (PVA), and more specifically, is formed by stretching a PVA film in one direction, and then adsorbing iodine (I) or a dichromatic dye thereon. The polarizing film 20 has an light absorption axis in the stretching direction thereof and a light transmission axis in a direction perpendicular to the absorption axis. Light incident onto the polarizing film 20 is thus linearly polarized such that the light has only components that are parallel to the transmission axis.

The retardation film 30 is attached to a top surface of the polarizing film 20. The retardation film 30 may comprise a biaxial film of cycloolefin polymer (COP). The COP exhibits good reliability under high temperature and humidity, and can be produced by a melting method. The retardation film 30 changes the phase of light transmitted therethrough, thereby converting linearly polarized light to circularly polarized light and vice versa. The retardation film 30 also serves to protect and support the polarizing film 20.

A supporting film 10 is attached to a bottom surface of the polarizing film 20, and serves to protect the polarizing film 20. The supporting film 10 preferably has a durability sufficient to provide the polarizing film 20 with mechanical strength, heat resistance, and moisture resistance. Further, the supporting film 10 is devoid of any optical characteristics that can change the optical characteristics of light transmitted therethrough. For example, the supporting film 10 may comprise triacetate cellulose (TAC), thereby providing a support film that has good durability and is devoid of any optical characteristics that can change the optical characteristics of light transmitted therethrough.

The supporting film 10 may be selectively used to protect the polarizing film 20. If the supporting film 10 is used, a pair of supporting films 10 are preferably used to protect the opposite surfaces of the polarizing film 20. However, when the retardation film 30 is used, the retardation film 30 can also serve as the supporting film 10, and thus, a second supporting film 10 is not required on the side of the polarizing film on which the retardation film 30 is formed.

The auxiliary film 50 is attached to a top surface of the retardation film 30. The auxiliary film 50 serves to increase the total thickness of the polarizer. The auxiliary film 50 increases the thickness of the polarizer, but preferably is devoid of any optical characteristics that can change the optical characteristics of light transmitted therethrough. Materials having this physical property include the supporting film 10 materials described above. Thus, the auxiliary film 50 may comprise the same material as the supporting film 10, for example, TAC.

The supporting film 10, the polarizing film 20, the retardation film 30, and the auxiliary film 50 are attached to each other by means of an adhesive or an adhesive layer 40. When the adhesive is used for the polarizing film 20, the adhesive is applied to both the bottom and the top surfaces of the polarizing film 20 so as to attach the supporting film 10 and the retardation film 30 thereto, respectively. The adhesive layer 40 is also used between the retardation film 30 and the auxiliary film 50. Further, an adhesive layer 40 is used on the auxiliary film 50 to enable the polarizer to be attached to a display panel of an LCD. The adhesive layer 40 has a thickness of about 20 µm. The adhesive, which has a thickness less than that of the adhesive layer 40, is coated on the bottom and top surfaces of the polarizing film 20 to keep the polarizing film 20 dry.

The auxiliary film 50 has a thickness of between about 50 µm and about 80 µm. When the auxiliary film 50 is used, the adhesive layer 40 is additionally used. Thus, when the auxiliary film 50 is used, the total thickness of the polarizer can be increased to a range of from about 70 µm to about 100 µm. The supporting film 10, the polarizing film 20, and the retardation film 30 have a combined total thickness of about 200 µm or less. The total thickness of the polarizer is between about 270 µm and about 300 µm, due to the presence of the auxiliary film 50. As described in more detail below, the auxiliary film 50 enables the polarizer to be easily detached from the display panel of an LCD for rework after the polarizer has been attached to the panel.

The adhesive force between the supporting film 10, the polarizing film 20, the retardation film 30, and the auxiliary film 50 is dependant on the respective materials of each film 10, 20, 30, or 50. For example, the adhesive force between a retardation film 30 of COP and a polarizing film 20 is relatively weak. Specifically, among the retardation films 30 currently being used, a Zeonor or an Arton film of COP has a relatively weak adhesive force compared to that of the polarizing film 20.

In contrast, an auxiliary film 50 comprising TAC attaches to the retardation film 30 with a relatively strong adhesive force. Thus, when the strength of adhesion between the polarizing film 20 and the retardation film 30 is compared with that between the retardation film 30 and the auxiliary film 50, the latter is markedly greater than the former. Therefore, if the films 10, 20, 30 and 50 constituting the polarizer are separated from each other, the polarizing film 20 will have a tendency to separate from the retardation film 30 first, due to the above disparities in adhesive strength.

Figure 2:
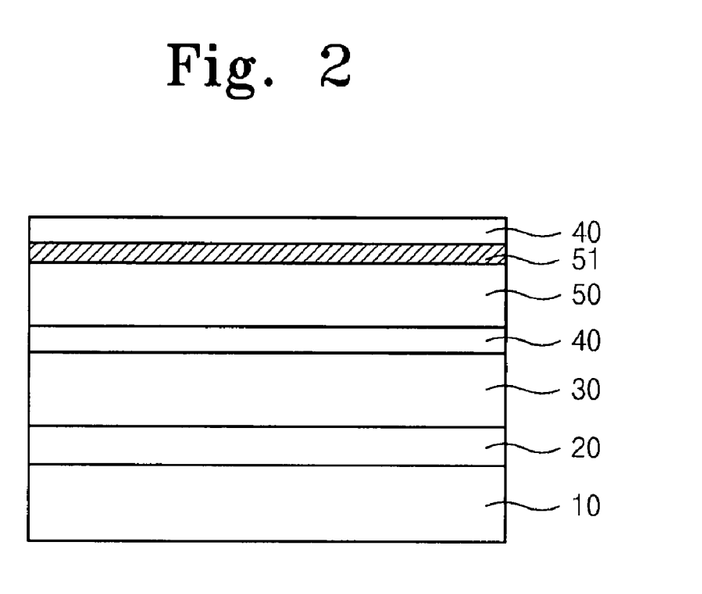
FIG. 2 is a partial cross-sectional view of a second exemplary embodiment of an LCD polarizer in accordance with the present invention.

FIG. 2 is a partial cross-sectional view of a second exemplary embodiment of an LCD polarizer in accordance with the present invention. In the following description thereof, a detailed description of those elements and structures that are identical to those of the first embodiment above is omitted for brevity.

Referring to FIG. 2, the second exemplary polarizer includes a supporting film 10, a polarizing film 20, a retardation film 30, and an auxiliary film 50. The polarizing film 20 has a transmission axis extending in one direction, and linearly polarizes incident light such that the light has only components that are parallel to the transmission axis. The retardation film 30 is attached to a top surface of the polarizing film 20, and the supporting film 10 is attached to a bottom surface of the polarizing film 20. The auxiliary film 50 is attached to a top surface of the retardation film 30. The auxiliary film 50 has a thickness selected to advantageously increase the total thickness of the polarizer.

Both the supporting film 10 and the auxiliary film 50 may include the same material, i.e., one that has no undesirable optical characteristics, for example, TAC. The auxiliary film 50 has an antistatic treated portion 51 on a top surface thereof. As a result of the antistatic treatment, the top surface of the auxiliary film 50 includes conductive beads thereon, and thus, the antistatic treated portion 51 provides a conductive path by which static electricity flowing from the outside to the inside of the panel or generated internally thereof can flow out.

Without an auxiliary film 50, the top surface of the retardation film 30 requires the antistatic treatment. However, it is difficult to form the antistatic treatment on the surface of the retardation film 30 uniformly. As a result, the antistatic treatment must be performed on the bottom surface of the supporting film 10. Because the bottom surface of the supporting film 10 is located on the outermost side, a separate surface-treated protective film is required to protect the antistatic treated bottom surface of the supporting film 10. The separate surface-treated protective film increases the production cost of the polarizer and decreases the light transmittance of the polarizer. In contrast, when the surface of the auxiliary film 50 is subjected to the antistatic treatment, the liquid crystal panel is attached to the upper side of the antistatic treated portion, and therefore, a separate surface-treated protective film is not required.

Following is a detailed description of some exemplary embodiments of LCDs employing the exemplary polarizers of the present invention.

Figure 3:
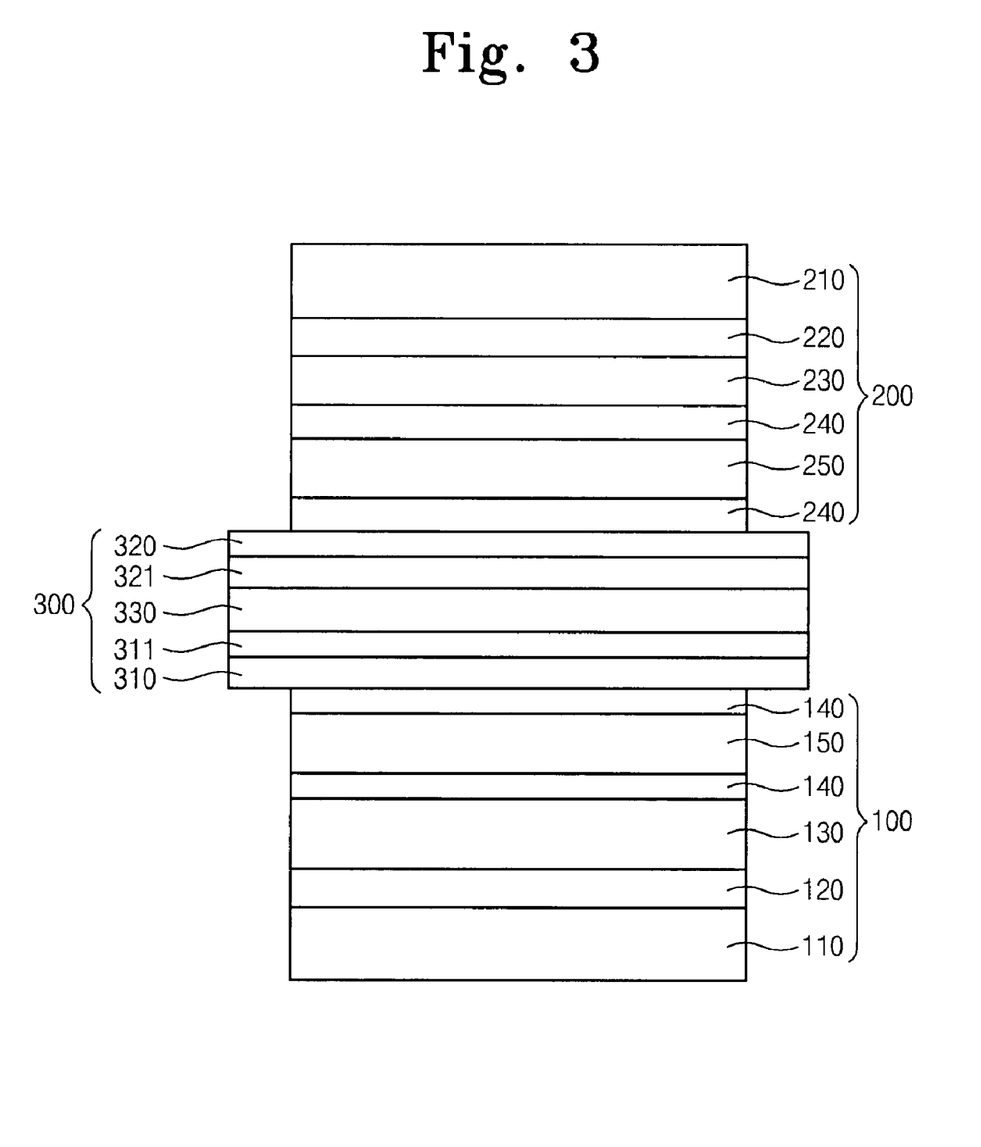
FIG. 3 is a partial cross-sectional view of a first exemplary embodiment of an LCD in accordance with the present invention.

FIG. 3 is a partial cross-sectional view of a first exemplary embodiment of an LCD in accordance with the present invention. Referring to FIG. 3, the LCD includes a first polarizer 100, a second polarizer 200, and a liquid crystal panel 300. The liquid crystal panel 300 includes first and second substrates 310 and 320 that are disposed in spaced opposition to each other. The first substrate 310 is provided with a first electrode 311, and the second substrate 320 is provided with a second electrode 321. A layer of a liquid crystal material 330 in which liquid crystals are arranged is interposed between the first substrate 310 and the second substrate 320.

The first polarizer 100 is attached to the first substrate 310 of the liquid crystal panel 300, while the second polarizer 200 is attached to the second substrate 320 of the liquid crystal panel 300. The first polarizer 100 includes a first supporting film 110, a first polarizing film 120, a first retardation film 130, and a first auxiliary film 150.

The first polarizing film 120 has a transmission axis oriented in one direction, and linearly polarizes incident light to components that are parallel to the transmission axis. The first retardation film 130 is attached to a top surface of the first polarizing film 120, and the first supporting film 110 is attached to a bottom surface of the first polarizing film 120. The first auxiliary film 150 is attached to a top surface of the first retardation film 130. The first auxiliary film 150 has a selected thickness, and thus, increases the total thickness of the first polarizer 100.

Both the first supporting film 110 and the first auxiliary film 150 are devoid of any optical characteristics that could cause an optical change to light transmitted therethrough. Therefore, both the first supporting film 110 and the first auxiliary film 150 may comprise the same material, and one having no undesirable optical characteristics, e.g., TAC.

The second polarizer 200 has a structure corresponding to that of the first polarizer 100. The second polarizer 200 includes a second supporting film 210, a second polarizing film 220, a second retardation film 230, and a second auxiliary film 250, which are sequentially attached to each other in a vertical, downward direction.

The LCD is provided with a separate backlight unit (not illustrated) for generating light and providing it to the display panel 300 thereof. The light emitted from the backlight unit is transmitted through the liquid crystal display panel 300 so that the panel displays an image. When the backlight unit is located below the first polarizer 100, the image is displayed in a direction of the second polarizer 200. In contrast, when the backlight unit is located above the second polarizer 200, the image is displayed in a direction of the first polarizer 100. The terms first and second are used here to distinguish the two polarizers 100 and 200 from each other, and thus, the following description assumes that the backlight unit is located below the first polarizer 100, which is located below the liquid crystal panel 300.

In the first substrate 310, a plurality of generally orthogonal metal interconnections intersect each other to define a plurality of rectangular pixel regions thereon. The pixel regions refer to a least unit for displaying an image. The first electrode 311 corresponds to a pixel electrode that is discretely formed at each pixel region. The second electrode 321 corresponds to a common electrode that is integrally formed on the second substrate 320.

Following is a description of the operation of the LCD in which a "normally black" mode of operation is used as an example. Light is emitted from the backlight unit (not illustrated) disposed below the first polarizer 100. The light travels through the first polarizer 100, and is thereby linearly polarized to have only components that are parallel to the transmission axis of the first polarizing film 120. The linearly polarized light then passes through the display panel 300. When no electric field is being applied to the electrodes, the liquid crystals in the liquid crystal panel 300 are aligned perpendicular to the first and second substrates 310 and 320, and the linearly polarized light therefore passes through the liquid crystals without a phase change. The second polarizing film 220 is disposed such that its transmission axis is perpendicular to the transmission axis of the first polarizing film 120, and the linearly polarized light reaching the second polarizer 200 is therefore completely absorbed. In this case, no image is displayed by the panel, and the LCD is thus disposed in a "black" state.

To display an image, a data voltage corresponding to an image to be displayed at each pixel region is applied to the first electrode 311, and a constant common voltage is applied to the second electrode 321. As a result, an electric field is generated between the electrodes that acts on the liquid crystals of each of the pixels due to the difference between the data voltage and the common voltage. When the direction of alignment of the liquid crystals is changed by the electric field, the light that was linearly polarized when passing through the first polarizer 100 experiences a change in phase when it passes through the liquid crystals, so that the light can then pass through the second polarizer 200. The intensity of the electric field is dependent on the image to be displayed. When the brightness of the light transmitted through the second polarizer 200 is at a maximum, the LCD is disposed in a "white" state.

In the operation of the LCD described above, the first and second retardation films 130 and 230 change the phase of the light respectively passing therethrough to improve the viewing angle or brightness of the LCD. The first and second auxiliary films 150 and 250 are not directly involved with the operation of the LCD, but rather, with its manufacture.

When the LCD is being fabricated, the liquid crystal display panel 300, the first polarizer 100, and the second polarizer 200 are each fabricated separately, and the first and second polarizers 100 and 200 are then attached to opposite surfaces of the liquid crystal panel 300. As a result of errors occurring during the attaching process or during a process subsequent thereto, either one or both of the first and second polarizers 100 and 200 may become defective, thereby necessitating a rework of the panel during which any bad polarizers are replaced.

Figure 4A:
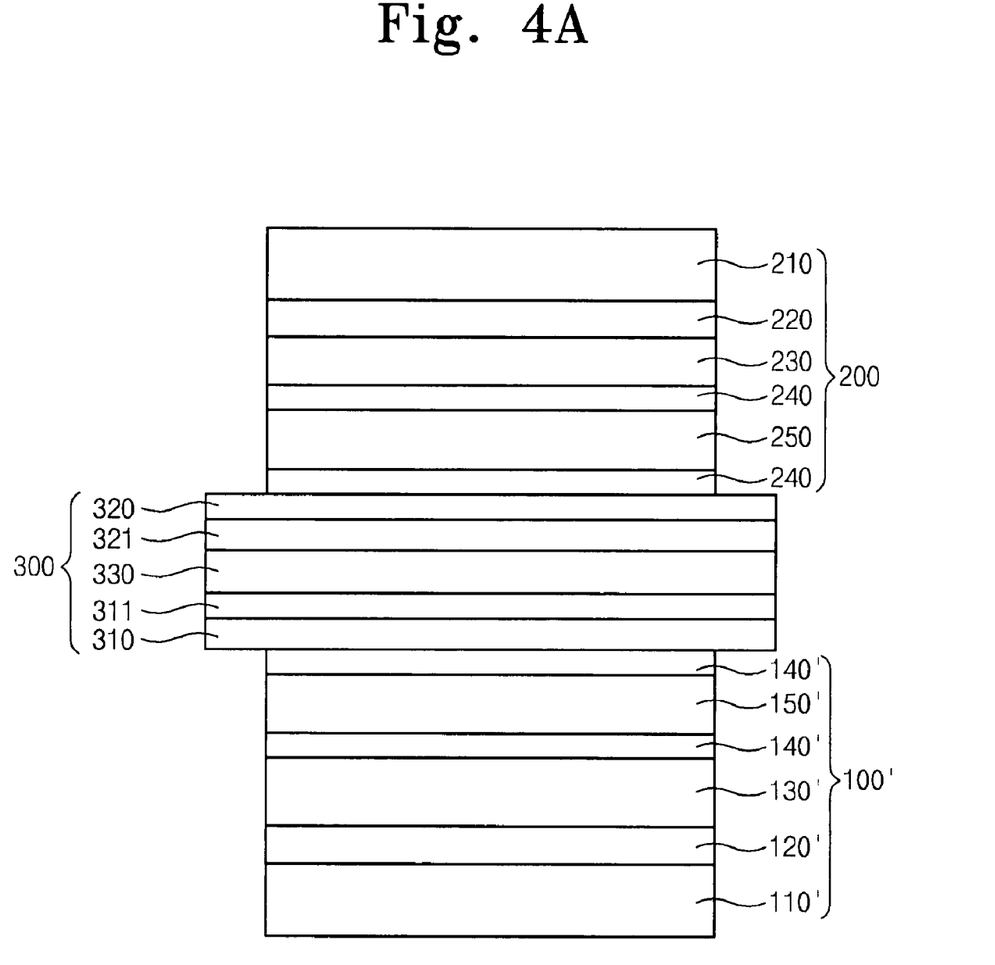
FIGS. 4A through 4D are partial cross-sectional views of the exemplary LCD of FIG. 3, showing sequential stages of a process of replacing a polarizer thereof.

FIGS. 4A through 4D are partial cross-sectional views of the exemplary LCD of FIG. 3, showing sequential stages of a process for replacing a defective polarizer thereof. Referring to FIG. 4A, the LCD is provided with a first polarizer 100', a second polarizer 200', and a liquid crystal panel 300. The first polarizer 100' comprises a first supporting film 110', a first polarizing film 120', a first retardation film 130', and a first auxiliary film 150', and is assumed to be defective, thereby giving rise to the need for reworking the panel 300 to replace the first polarizer 100' in part or in whole.

Figure 4B:
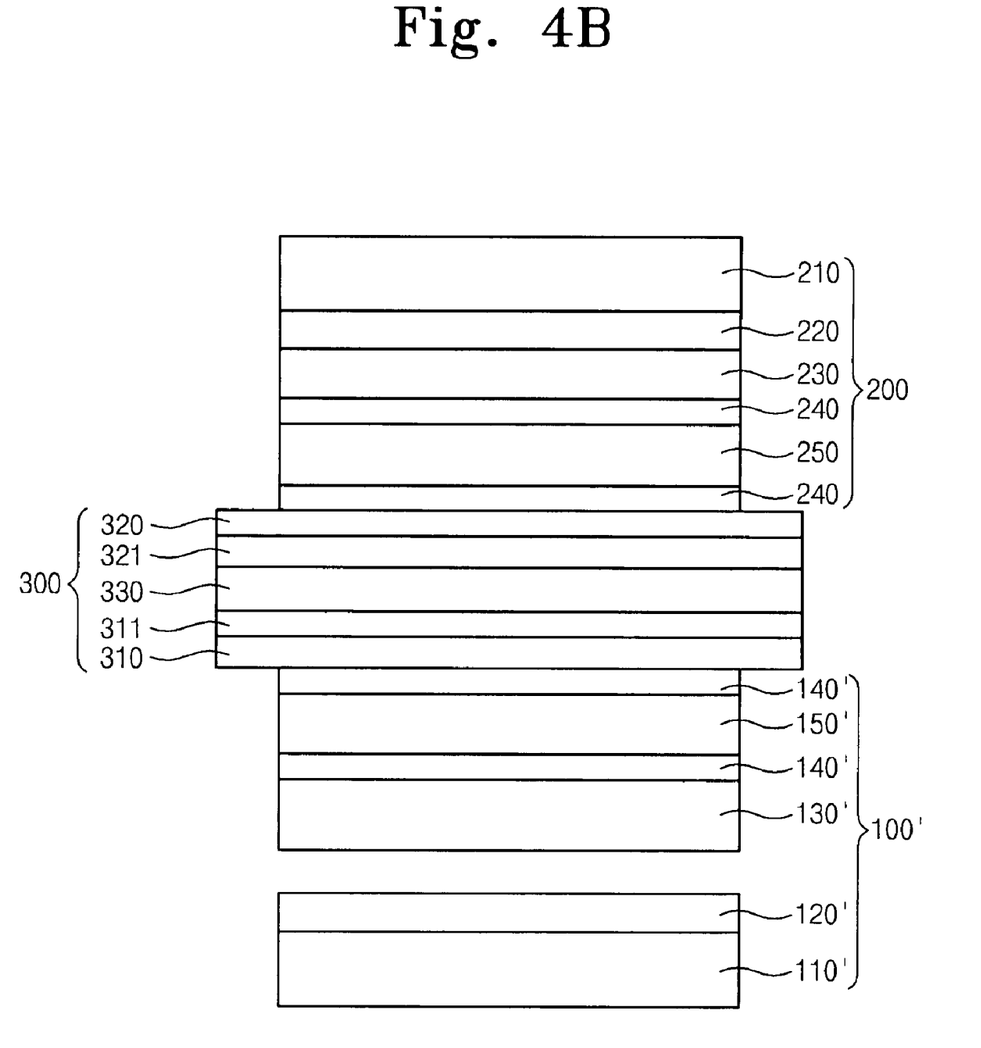

Referring to FIG. 4B, only a part of the first polarizer 100' is detached from the liquid crystal panel 300 at first, i.e., the entire first polarizer 100' is not detached at one time. As discussed above, among the three stacked interfaces, i.e., between the first supporting film 110' and the first polarizing film 120', between the first polarizing film 120' and the first retardation film 130', and between the first retardation film 130' and the first auxiliary film 150', the interface having the weakest strength of adhesion is detached first.

As described above, where the first retardation film 130' is a Zeonor or an Arton film of the type predominately used at present, the adhesive strength between the first polarizing film 120' and the first retardation film 130' is the weakest of the interfaces. Current LCDs have relatively large screens of about 100 square inches. Until now, Zeonor films have been used exclusively for the larger LCDs of 70 square inches or more. Hence, where the LCD has a size of 70 square inches or more, a stack including the first supporting film 110' and the first polarizing film 120' is detached first in the first polarizer 100'. As a result, the stack including the first retardation film 130' and the first auxiliary film 150' in the first polarizer 100' remains attached to the liquid crystal panel 300.

Figure 4C:
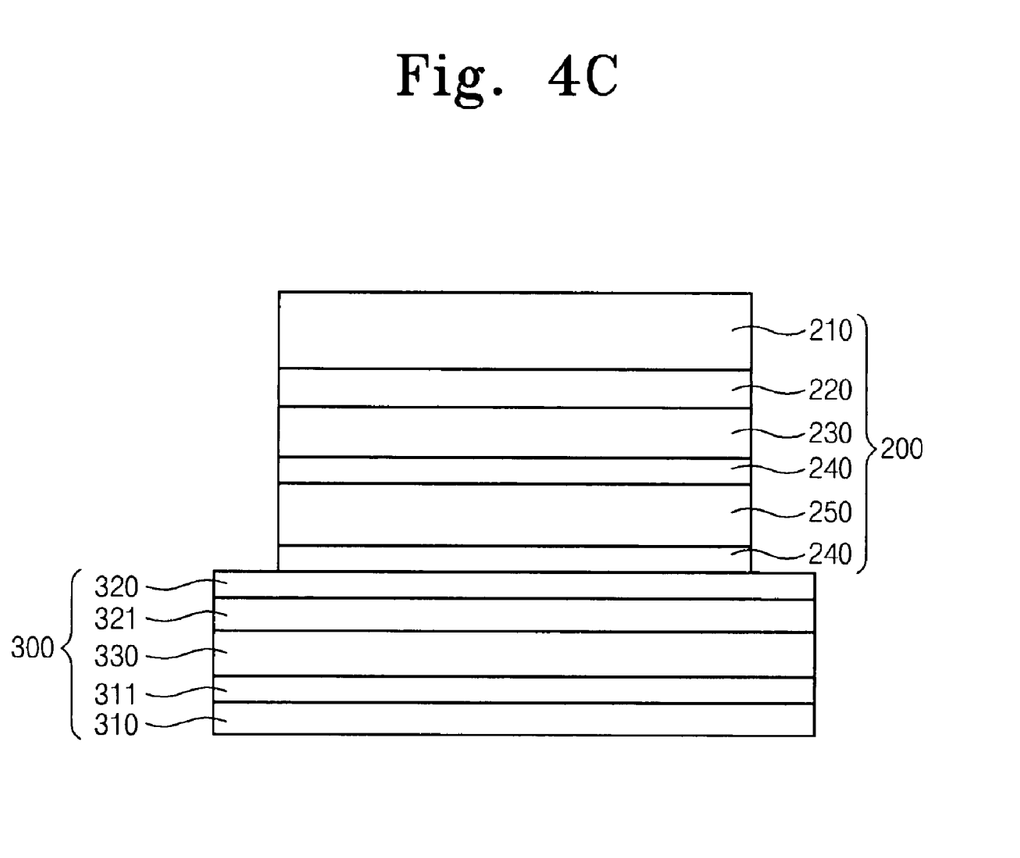

Referring to FIG. 4C, the remaining stack of the first polarizer 100' is next removed from the liquid crystal panel 300. As to the thickness of the remaining stack, the first retardation film 130' and a first adhesive layer 140' located on the first retardation film 130' amount to about 100 μm or less in all, and the first auxiliary film 150' and another first adhesive layer 140' located on the first auxiliary film 150' amount to a range of from about 70 μm to about 100 μm in all. If the first auxiliary film 150' is not used, the thickness of the remaining stack amounts to 100 μm or less, so that the remaining stack cannot easily be detached from the liquid crystal panel 300. Furthermore, when the remaining stack is relatively thin, e.g., has a thickness of 100 μm or less, and must be detached using an excessive force, the liquid crystal panel 300 can easily be damaged during the detachment process.

However, when the first auxiliary film 150' is used, the stack remaining on the display panel 300 has a thickness of 200 μm or less, which is sufficient to enable the remaining stack to be easily detached from the liquid crystal panel 300 without damaging it.

Figure 4D:
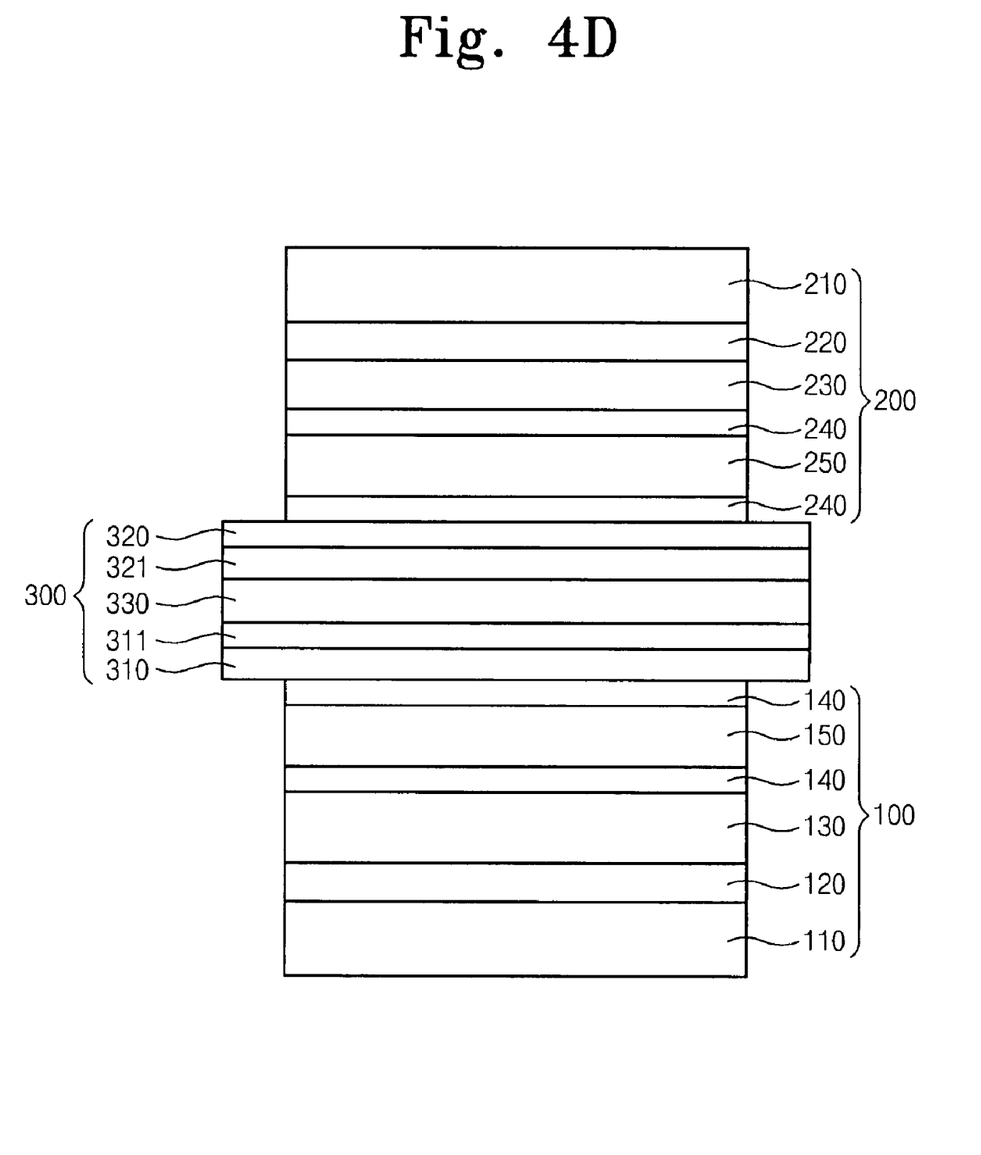

Referring to FIG. 4D, after the defective first polarizer 100' is removed, a new first polarizer 100 is attached to the LCD panel 300. The first polarizer 100 and the LCD panel 300 are adhered to each other by means of the adhesive force of an adhesive layer 140 on the first auxiliary film 150. If the replacement polarizer 100 that is attached has an insufficient thickness, numerous bubbles can form in the adhesive such that the adhesive force and the polarization performance of the first polarizer 100 are degraded. However, due to the presence of the first auxiliary film 150, the first polarizer 100 has a thickness that is sufficient to prevent the formation of such bubbles.

Using the foregoing method, the first polarizer 100 can easily be reworked several times, if necessary, and moreover, the same is true for the second polarizer 200, as well.

Figure 5:
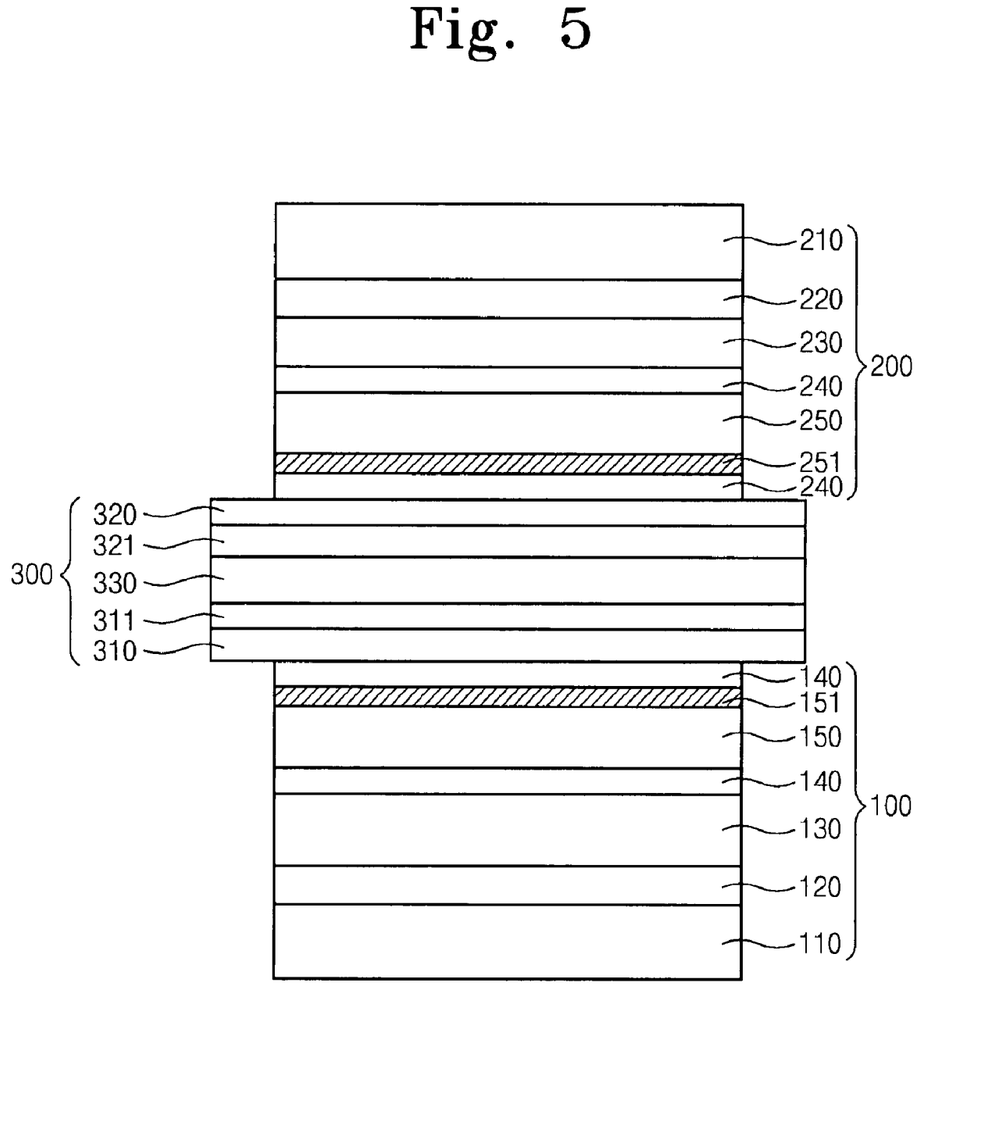
FIG. 5 is a partial sectional view of a second exemplary embodiment of an LCD in accordance with the present invention.

FIG. 5 is a partial sectional view of a second exemplary embodiment of an LCD in accordance with the present invention. In the following description thereof, a detailed description of those elements and structure that are identical to those of the first exemplary LCD described above are omitted for brevity.

Referring to FIG. 5, the second exemplary LCD includes a first polarizer 100, a second polarizer 200, and a liquid crystal panel 300. The first polarizer 100 is attached to a first substrate 310 of the liquid crystal panel 300, while the second polarizer 200 is attached to a second substrate 320 thereof. The first and second polarizers 100 and 200 correspond to each other structurally, and include first and second supporting films 110 and 210, first and second polarizing films 120 and 220, first and second retardation films 130 and 230, and first and second auxiliary films 150 and 250, respectively.

The first and second auxiliary films 150 and 250 may function to advantageously increase the total thicknesses of the first and second polarizers 100 and 200, thereby facilitating rework, as above. The first and second auxiliary films 150 and 250 have antistatic treated portions 151 and 251 on respective surfaces thereof. As a result of the antistatic treated portions 151 and 251, the surfaces of the first and second auxiliary films 150 and 250 include conductive beads disposed thereon, and thus, static electricity, which flows from the outside to the inside of the LCD or is generated internally thereof, flows out along the surfaces of the first and second auxiliary films 150 and 250. This prevents the static electricity from flowing into the LCD display panel 300 and causing a malfunction in its operation.

The antistatic treatment may be performed on any film constituting the first and second polarizers 100 and 200, but most advantageously, is performed on the first and second auxiliary films 150 and 250.

The antistatic treatment is described in conjunction with its formation on the first polarizer 100, but can be applied to the second polarizer 200, as well. Without the first auxiliary film 150, the antistatic treatment is required for any one of the first supporting film 110 and the first retardation film 130. However, it is difficult to form the antistatic treatment on the surface of the first retardation film 130 uniformly due to its material characteristics. As a result, the antistatic treatment must be performed on a bottom surface of the first supporting film 110. Because the bottom surface of the first supporting film 110 is located on the outermost side, a separate surface-treated protective film is required to protect the antistatic treated bottom surface of the first supporting film 110. As will be appreciated, the need for the separate surface-treated protective film results in an increase in the production cost of the polarizer as well as a decrease in the light transmittance of the polarizer.

Moreover, even if the increased production cost and lower transmittance are not taken into consideration, it should be understood that the closer the antistatic treated portion is disposed to the liquid crystal panel 300, the more advantageous it is to form the antistatic treated portion on the first polarizer 100. This is because static electricity is generated in the LCD panel 300 during the process of attaching the first polarizer 100 thereto. During this process, the first polarizer 100 is transferred with a separate release film attached to a first adhesive layer 140 located on the first auxiliary film 150. The release film is subsequently removed so as to leave the first polarizer 100 attached to the liquid crystal panel 300.

The first polarizer 100 is then rubbed with a firm pressure. During the rubbing process, static electricity is generated. Further, when the release film is removed, a large quantity of static electricity is generated by an electrification phenomenon caused by the separation of static charges when two objects in close contact with each other are separated. Because the static electricity is generated close to the liquid crystal panel 300, performing the antistatic treatment on the first auxiliary film 150 has a better antistatic effect than performing the antistatic treatment on the first supporting film 110.

Figure 6:
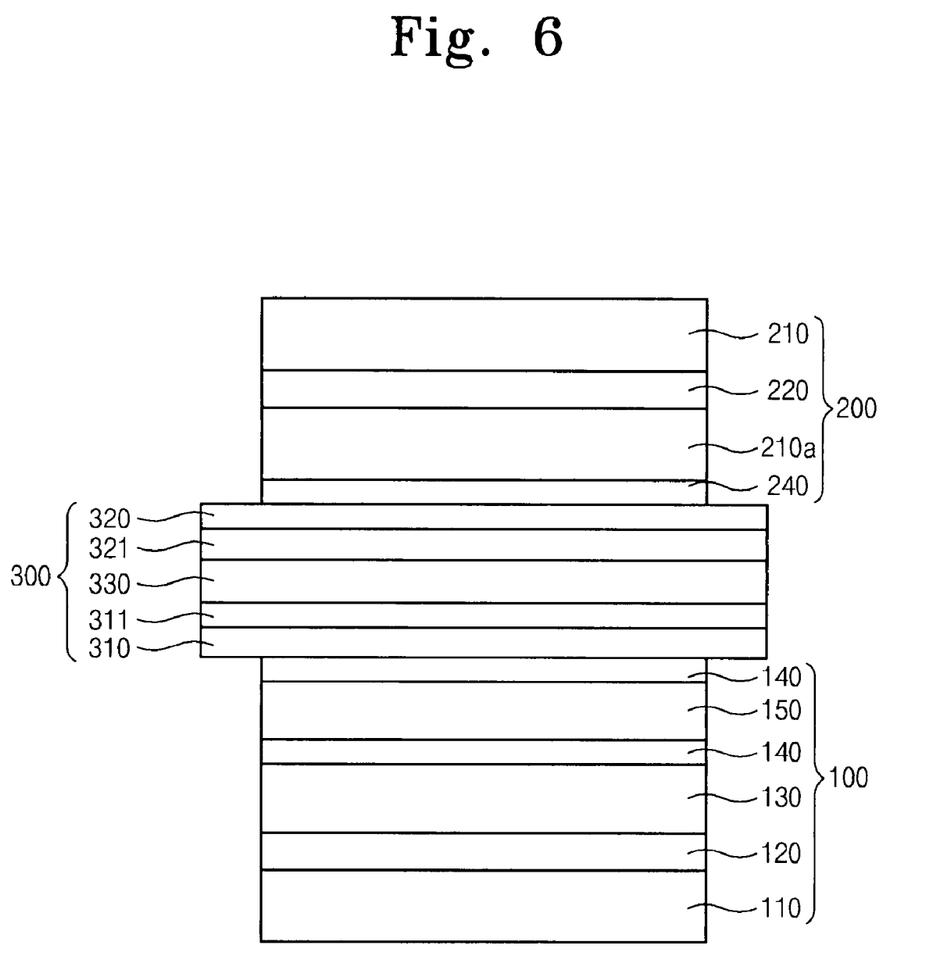
FIG. 6 is a partial cross-sectional view of a third exemplary embodiment of an LCD in accordance with the present invention.

FIG. 6 is a partial cross-sectional view of a third exemplary embodiment of an LCD in accordance with the present invention. As above, detailed description of those elements that are the same as those in the above embodiments is omitted.

Referring to FIG. 6, the liquid crystal display includes a first polarizer 100, a second polarizer 200, and a liquid crystal panel 300. The first polarizer 100 is attached to a first substrate 310 of the liquid crystal panel 300, while the second polarizer 200 is attached to a second substrate 320 thereof. The first polarizer 100 includes a first supporting film 110, a first polarizing film 120, a first retardation film 130, and a first auxiliary film 150.

The second polarizer 200 includes a second polarizing film 220, a second supporting film 210, and a third supporting film 210a. The second supporting film 210 is attached to a top surface of the second polarizing film 220, and the third supporting film 210a is attached to a bottom surface of the second polarizing film 220. The second polarizer 200 is attached to the second substrate 320 by a second adhesive layer 240 formed on a bottom surface of the third supporting film 210a.

Inasmuch as the viewing angle of the LCD can be increased sufficiently by the first retardation film 130 of the first polarizer 100, a separate second retardation film is not required for the second polarizer 200. Instead of the second retardation film, the third supporting film 210a is used in the second polarizer 200 to support the second polarizing film 220. The first, second and third supporting films 110, 210 and 210a, and the first auxiliary film 150 may comprise the same material, such as TAC.

Figure 7:
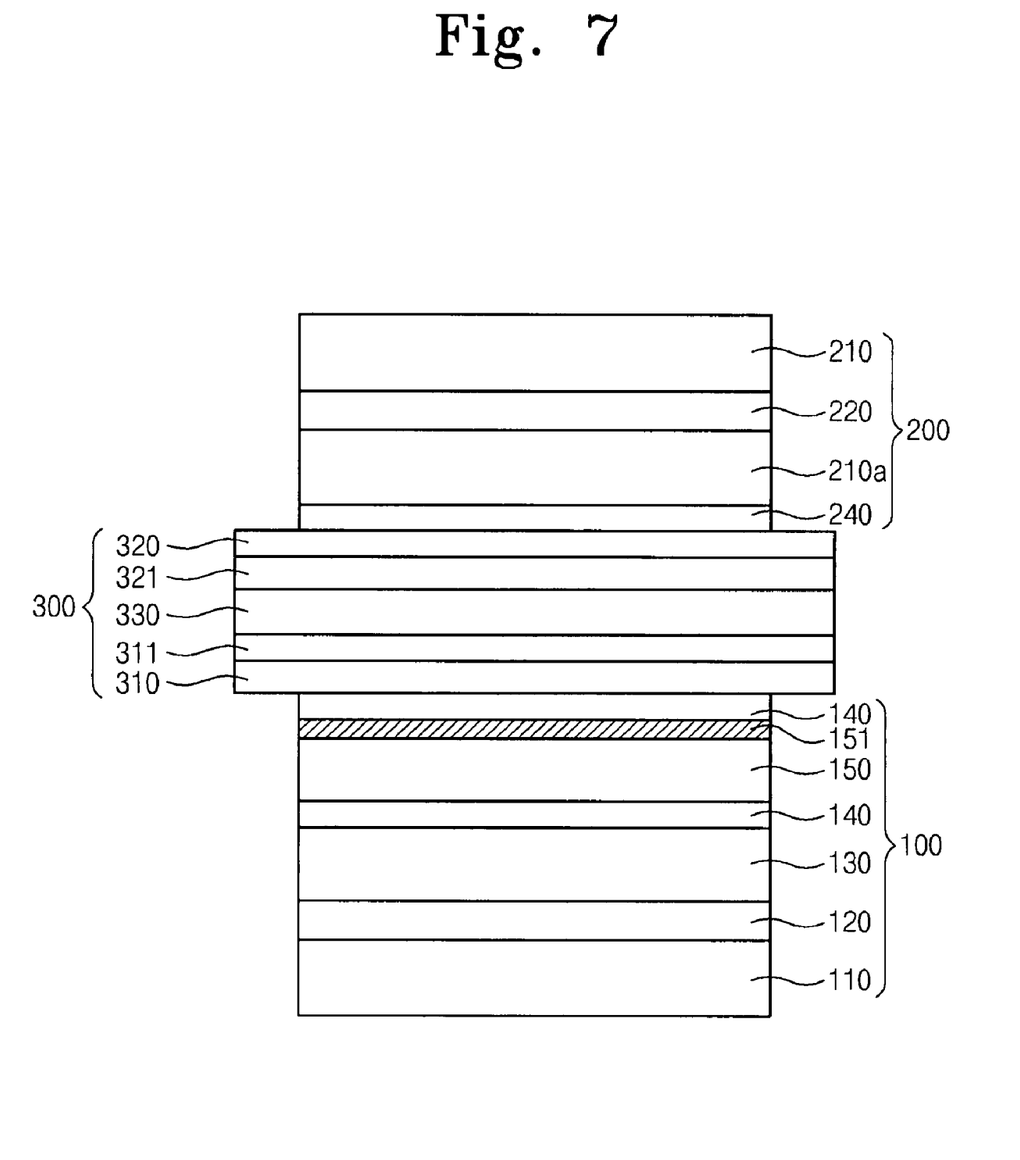
FIG. 7 is a partial cross-sectional view of fourth exemplary embodiment of an LCD in accordance with the present invention; and, FIG. 8 is a partial cross-sectional view of a fifth exemplary embodiment of an LCD in accordance with the present invention.

FIG. 7 is a partial cross-sectional view of fourth exemplary embodiment of an LCD in accordance with the present invention. As above, detailed description of those elements that are the same as those in the above embodiments is omitted.

Referring to FIG. 7, a first polarizer 100 includes a first retardation film 130 and a first auxiliary film 150 that is strongly attached to the first retardation film 130 so as to enable rework to be easily performed on the first polarizer 100. A top surface of the first auxiliary film 150 includes an antistatic treated portion 151.

A second polarizer 200 is provided with second and third supporting films 210 and 210a protecting the second polarizing film 220 without a separate second retardation film. Where the second polarizer 200 includes an antistatic treated portion, a top surface of the second supporting film 210 or a bottom surface of the third supporting film 210a can be subjected to an antistatic treatment.

Figure 8:
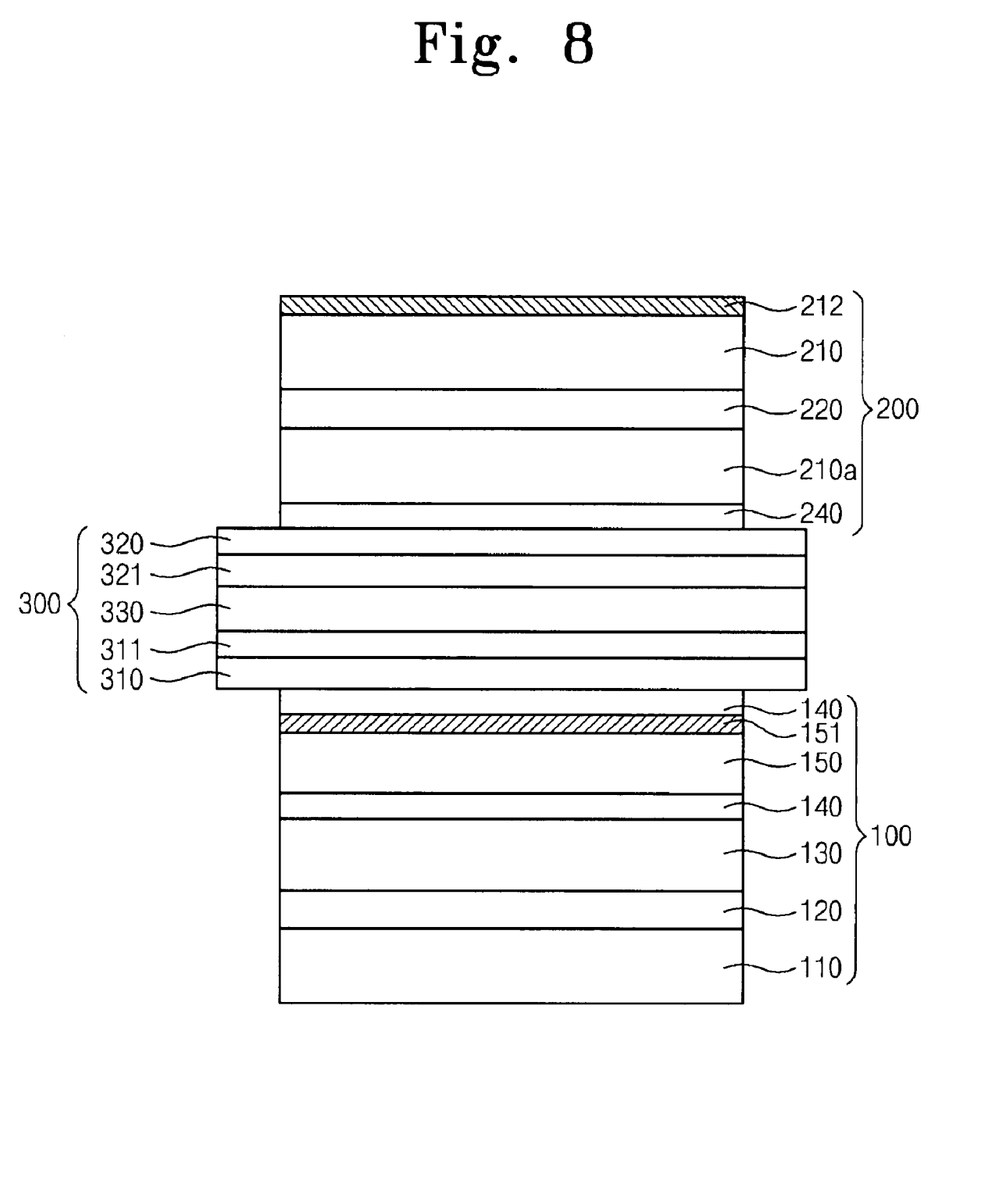

FIG. 8 is a partial cross-sectional view of a fifth exemplary embodiment of an LCD in accordance with the present invention. As above, detailed description of those elements that are the same as those in the above embodiments is omitted.

Referring to FIG. 8, a first polarizer 100 includes a first retardation film 130 and a first auxiliary film 150 having an antistatic treated portion 151. A second polarizer 200 includes second and third supporting films 210 and 210a supporting the second polarizing film 220 without a separate second retardation film. The second supporting film 210 can be separately treated to protect its surface because it is exposed to the outside where an image is displayed. The second supporting film 210 can also include an anti-glare treated portion 212 that is formed by a separate treatment process. The anti-glare treatment prevents natural light incident from the outside of the LCD from being irregularly reflected on the second polarizer 200, and as a result, prevents a reduction in the visibility of the LCD caused by the irregular reflection of the natural light.

As may be seen from the foregoing exemplary embodiments described herein, LCD polarizers are provided that make rework of LCD display panels much easier, and without causing damage to the panels, thereby enabling LCD production costs to be reduced.

Moreover, as those of skill in this art will by now appreciate, many modifications, substitutions and variations can be made in and to the LCD polarizers of this invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A polarizer, comprising:
   a polarizing film;
   a retardation film attached to the polarizing film; and,
   an auxiliary film attached to the retardation film, and the retardation film interposed between the polarizing film and the auxiliary film,
   wherein an adhesive strength between the auxiliary film and the retardation film is greater than an adhesive strength between the retardation film and the polarizing film.

2. The polarizer of claim 1, wherein the auxiliary film does not change the optical characteristics of light transmitted therethrough.

3. The polarizer of claim 1, further comprising a supporting film attached to the polarizing film,
   wherein the polarizing film is interposed between the retardation film and the supporting film.

4. The polarizer of claim 3, wherein the supporting film and the auxiliary film comprise the same material.

5. The polarizer of claim 3, wherein the total thickness of the polarizing film, the retardation film and the auxiliary film is in a range of from about 250 μm to about 300 μm.

6. The polarizer of claim 5, wherein the auxiliary film has a thickness of between about 50 μm and about 80 μm.

7. The polarizer of claim 4, wherein the supporting film and the auxiliary film comprise triacetate cellulose (TAC).

8. The polarizer of claim 1, wherein the retardation film has an area of at least about 70 square inches.

9. The polarizer of claim 1, wherein the retardation film comprises cycloolefin polymer (COP).

10. The polarizer of claim 1, wherein the auxiliary film has an antistatic treatment on a top surface thereof.

11. An LCD, comprising:
    a first substrate having a first electrode;
    a second substrate having a second electrode disposed in spaced opposition to the first electrode;
    a layer of a liquid crystal material disposed between the first and second electrodes;
    a first polarizer attached to the first substrate, and the first substrate interposed between the layer of the liquid crystal material and the first polarizer; and,
    a second polarizer attached to the second substrate, and the second substrate interposed between the layer of the liquid crystal material and the second polarizer,
    wherein the first polarizer comprises:
    a first polarizing film;
    a first retardation film attached to the first polarizing film; and,
    a first auxiliary film interposed between the first substrate and the first retardation film and attached to the first retardation film, the first retardation film interposed between the first auxiliary film and the first polarizing film,
    wherein an adhesive strength between the first auxiliary film and the first retardation film is greater than an adhesive strength between the first retardation film and the first polarizing film.

12. The LCD of claim 11, further comprising a first supporting film attached to the first polarizing film,
    wherein the first polarizing film is interposed between the first retardation film and the first supporting film.

13. The LCD of claim 11, wherein the first auxiliary film has an antistatic treatment on a top surface thereof.

14. The LCD of claim 11, wherein pixel regions are defined in the first substrate, and wherein the first electrode comprises a pixel electrode that is discretely formed at each pixel region.

15. The LCD of claim 14, wherein the second polarizer comprises:
    a second polarizing film;
    a second retardation film attached to the second polarizing film; and,
    a second auxiliary film interposed between the second substrate and the second retardation film and attached to the second retardation film,
    wherein an adhesive strength between the second auxiliary film and the second retardation film is greater than an adhesive strength between the second retardation film and the second polarizing film.

16. The LCD of claim 15, wherein the first and second auxiliary films do not change the optical characteristics of light respectively transmitted therethrough.

17. The LCD of claim 15, further comprising a second supporting film attached to the second polarizing film,
wherein the second polarizing film is interposed between the second retardation film and the second supporting film.

18. The liquid crystal display of claim 14, wherein the second polarizer comprises:

a second polarizing film;

a second supporting film attached to the second polarizing film; and, a third supporting film attached to the second polarizing film, so that the second substrate is interposed between the second substrate and the second polarizing film.

19. The liquid crystal display device of claim 18, wherein the second supporting film has a non-reflective treatment on a top surface thereof.

* * * * *